United States Patent [19]

Sakamura et al.

[11] Patent Number: 5,606,675
[45] Date of Patent: Feb. 25, 1997

[54] DATA PROCESSOR FOR INVALIDATING PREFETCHED INSTRUCTION OR BRANCH HISTORY INFORMATION

[75] Inventors: Ken Sakamura, Tokyo; Akira Ohtsuka, Itami, both of Japan

[73] Assignee: Mitsubishi Denki Kabushiki Kaisha, Tokyo, Japan; a part interest

[21] Appl. No.: 873,525

[22] Filed: Apr. 21, 1992

Related U.S. Application Data

[63] Continuation of Ser. No. 668,316, Mar. 13, 1991, abandoned, which is a continuation of Ser. No. 171,624, Mar. 22, 1988, abandoned.

[30] Foreign Application Priority Data

Sep. 30, 1987 [JP] Japan ................................. 62-246622

[51] Int. Cl.$^6$ ............................................................ G06F 9/30
[52] U.S. Cl. ........................ 395/584; 395/468; 395/383; 364/243.41; 364/DIG. 1
[58] Field of Search ..................................... 395/375, 800, 395/468; 364/243.41, DIG. 1

[56] References Cited

U.S. PATENT DOCUMENTS

| | | | |
|---|---|---|---|
| 4,713,755 | 12/1987 | Worley, Jr. et al. ................... | 395/375 |
| 4,755,966 | 7/1988 | Lee et al. ............................... | 364/900 |
| 4,760,519 | 7/1988 | Papworth et al. ..................... | 364/200 |
| 4,760,520 | 7/1988 | Shintani et al. ....................... | 364/200 |
| 4,775,927 | 10/1988 | Hester et al. .......................... | 364/200 |
| 4,785,392 | 11/1988 | Maier et al. ........................... | 364/200 |
| 4,989,140 | 1/1991 | Nishimukai et al. .................. | 364/200 |

OTHER PUBLICATIONS

IEEE Micro, Aug. 1987, "Intro. to the Clipper Architecture".
IEEE Computer, Mar. 1987, "A Survey of Microprocessor Architecture".
The Motorola MC68000 Microprocessor Family & Assembly Language, Interface Design, and System Design, by Harman, et al 1985 pp. 92,93,198–199,200,201,285–301.

Primary Examiner—Alyssa H. Bowler
Assistant Examiner—John Harrity
Attorney, Agent, or Firm—Townsend and Townsend and Crew LLP

[57] ABSTRACT

The invention provides a novel data processor containing specific instructions including that which invalidates the content or branch records stored in cache memory, instruction queue, instruction pipeline, and branch prediction mechanism, and that which fetches and executed instructions having propriety, so that the data processor to securely coordinate the instruction string of main memory and those instructions to be actually processed, thus eventually preventing the instruction pipelines from conflict between them.

7 Claims, 4 Drawing Sheets

5,606,675

DATA PROCESSOR FOR INVALIDATING PREFETCHED INSTRUCTION OR BRANCH HISTORY INFORMATION

This is a Continuation of application Ser. No. 07/668,316, filed Mar. 13, 1991, now abandoned, which is a cont. of Ser. No. 171,624, filed Mar. 22, 1988, abandoned.

BACKGROUND OF THE INVENTION

1. Field of the Invention

The present invention relates to a data processor, more particularly, to a data processor which is provided with either of cache memory, instruction queue, instruction pipelines, and branch prediction system, or a plurality of these, or all of these.

2. Description of the Prior Art

FIG. 1 denotes the simplified block diagram of memory hierarchy shown in "MICRO", August, 1987, a publication of IEEE, which incorporates CPU (central processing unit) 1, cache memory 2, main memory 3, and secondary storage 4, which are respectively installed in the hierarchical order.

FIG. 2 denotes the simplified block diagram of the data processor introduced in "MICRO", August, 1987, cited above, which represents the constitution of the pipeline system of the CPU 1, where the pipeline system incorporates pre-fetch unit 5 of cache memory 2, prefetch unit 6 of the CPU 1, decode control unit 7, and the execution unit 8, respectively. FIG. 3 denotes the schematic diagram of the address translation mechanism shown in "MICRO", March, 1987.

Next, operations of the conventional data processor cited above for example are described below.

First, a consideration is given to a case of operating the data processor shown in FIG. 1, in which the program shown in FIG. 4 is executed by the CPU 1 having the pipeline system shown in FIG. 2. This program features the following:

When executing the program shown in FIG. 4, after establishing the branch condition B2, the operation loop constituted by the first and second instructions I1 and I2 is repeatedly executed until the branch condition B1 is established. Then, after establishing the branch condition B1, the operation loop is discontinued to allow other processes to be executed. In other words, even if the branch condition B1 is established, the program allow the looped operation to be continuously executed until the branch condition B2 is established.

When the branch condition B2 is established while the execution of the program shown in FIG. 4 is underway, the CPU 1 then switches its control over to the instruction which designates rewriting of the no operation instruction into the conditional branch instruction judging the branch condition B1. As a result, the no operation instruction is converted into the conditional branch instruction which judges the branch condition B1, and then, the first and second instructions I1 and I2 are repeatedly executed until the branch condition B1 is eventually established.

Also, when operating the data processor shown in FIG. 1, if either the CPU 1 or the bus master rewrites a region of the main memory 3 previously cached to cache memory 2, without rewriting the corresponding region of the cache memory 2, the data stored in the main memory 3 and cache memory 2 may not correctly match each other. To prevent this problem, the operating system invalidates the entry of cache memory 2 corresponding to the changed region of the main memory.

Alternatively, when operating the address translation system shown in FIG. 3, if either the value of segment register or the access rights are changed by execution of instructions, like the above case, the operating system then identifies it and invalidates the data thus previously cached.

Since any of the conventional data processors employs a typical constitution mentioned above, if the pipeline incurs conflict by rewriting of instruction, change of stored contents in the main memory and the contents of the address translation mechanism except for using hardware to detect occurrence of conflict, any conventional data processor cannot judge whether the program is correctly executed, or not.

SUMMARY OF THE INVENTION

The present invention overcomes those problems mentioned above in conjunction with conventional data processors by providing a novel data processor which securely prevents conflict from taking place in the instruction pipeline caused by rewriting of instructions, change of data stored in the main memory and the content of the address translation mechanism to eventually ensure smooth coordination between the instruction lines of the main memory and the actually processed instructions.

The data processor related to the invention invalidates the instruction cache and the instruction pipeline even when executing user-programs with respect to change of instruction or access to the main memory with out via the cache memory, and yet, the data processor securely fetches and executes instructions having propriety at that time.

The above and further objects and features of the invention will more fully be apparent from the following detailed description with accompanying drawings.

DESCRIPTION OF THE PREFERRED EMBODIMENTS

Referring now more particularly to the accompanying drawings, preferred embodiments of the data processor related to the invention are described below.

Figure 1:
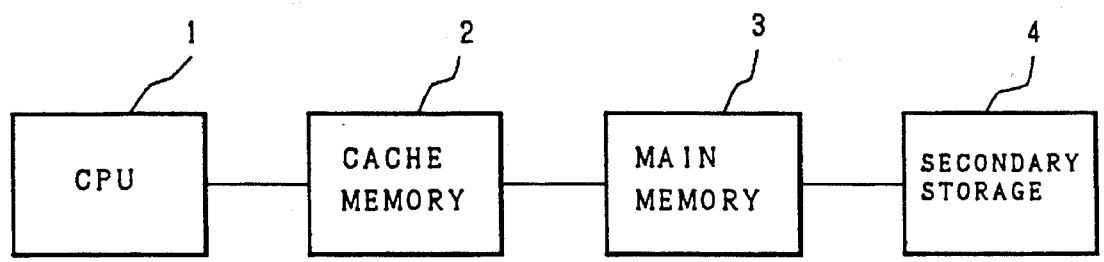
FIGS. 1 and 2 respectively the simplified block diagrams of hardware of the data processor related to the invention and a conventional data processor.
Figure 2:
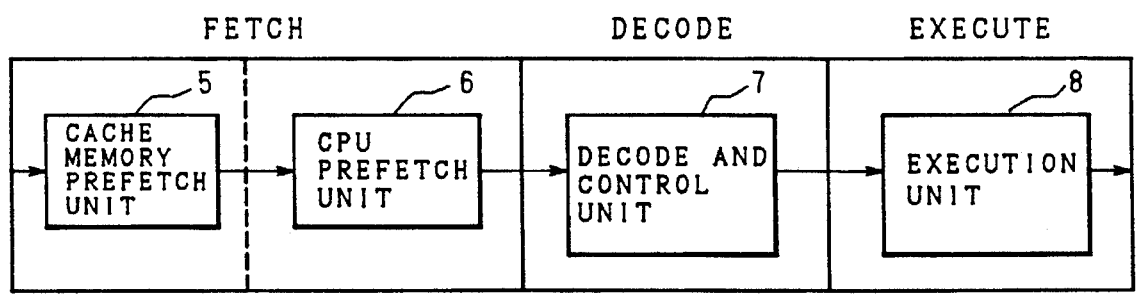
Figure 5:
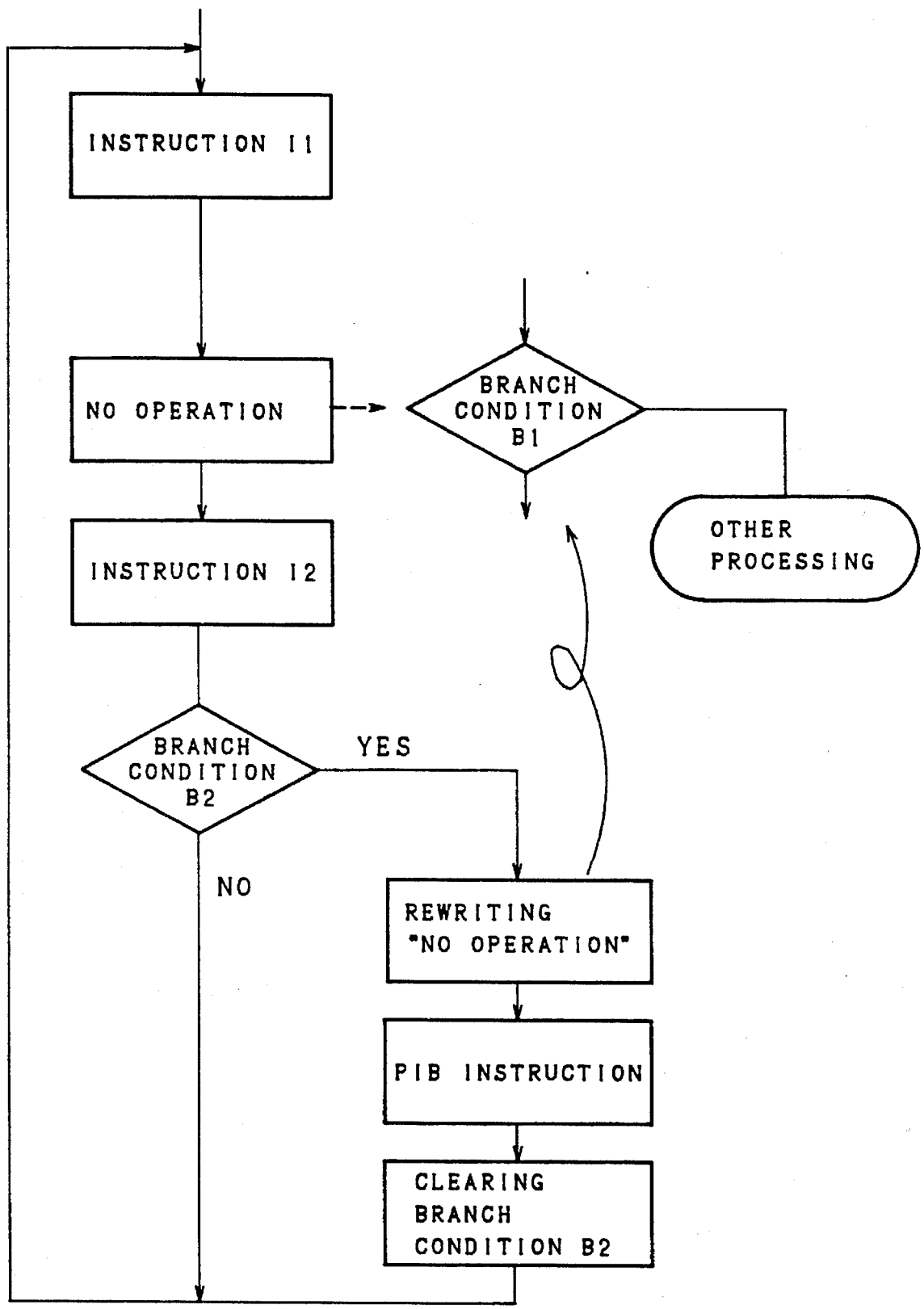
FIG. 5 is the operation flowchart denoting the sequence of executing programs of the data processor related to the invention.

First, a consideration is given to the case of executing the program in conjunction with the operation flowchart shown in FIG. 5 using the CPU 1 having a pipeline system shown in FIG. 2 of the data processor shown in FIG. 1.

Figure 4:
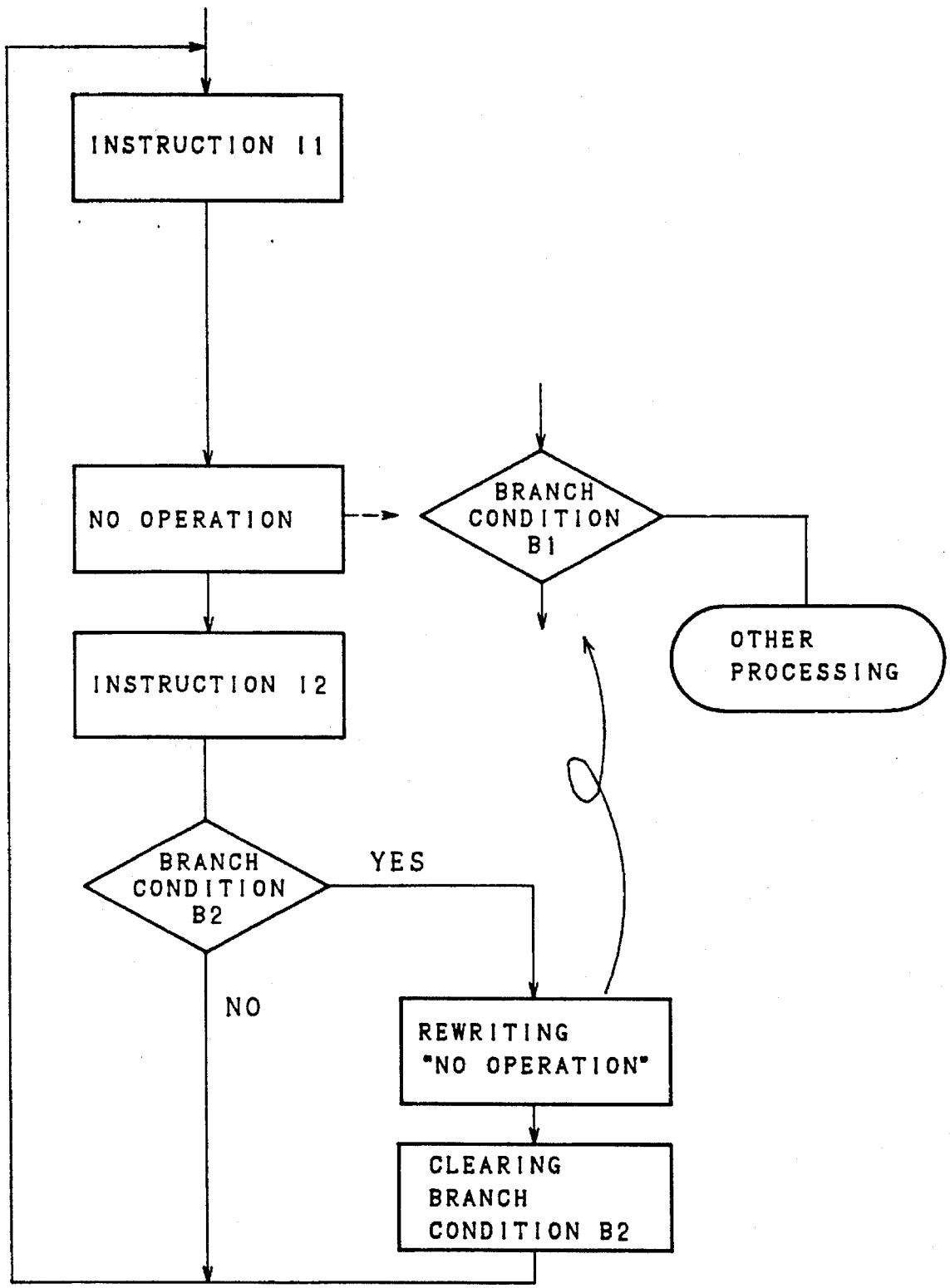
FIG. 4 the operation flowchart denoting the sequential execution of a program containing a plurality of instructions having different orders of execution priority executed by a conventional data processor.

Basically, the program shown in FIG. 5 executes data-processing identical to that shown in FIG. 4. Concretely, after establishing the branch condition B2, the operation loop constituted by the first and second instructions I1 and I2 is repeatedly executed until the branch condition B1 is established. Then, after establishing the branch condition B1, the operation loop is discontinued to allow other processes to be executed.

The program shown in FIG. 5 executes data processing identical operations similar to that shown in FIG. 4. However, after rewriting the no operation instruction into the conditional branch instruction which judges the branch condition B1, this program then executes the PIB instruction featuring the invention to invalidate cache memory, instruction queue, instruction pipeline, and branch prediction system, which has been effective until the no operation instruction is rewritten into the conditional branch instruction. The program then allows further operations to continuously run in order that correct instructions present in memory means can securely be executed.

The CPU 1 may preliminarily fetch the instruction containing the rewritten content of hardware such as cache memory or instruction queue, however, in spite of this condition, data processing operation is executed in accordance with the sequence intended by the program.

When operating the data processor shown in FIG. 1, if either the CPU 1 or bus master rewrites the region cached from the main memory 3 to cache memory 2 without via the cache memory 2 and causes the content of the main memory 3 to differ from the content of the cache memory 2, the CPU then executes PIB instruction to fetch correct instruction present in the main memory 3 at the executing time before eventually executing it.

Figure 3:
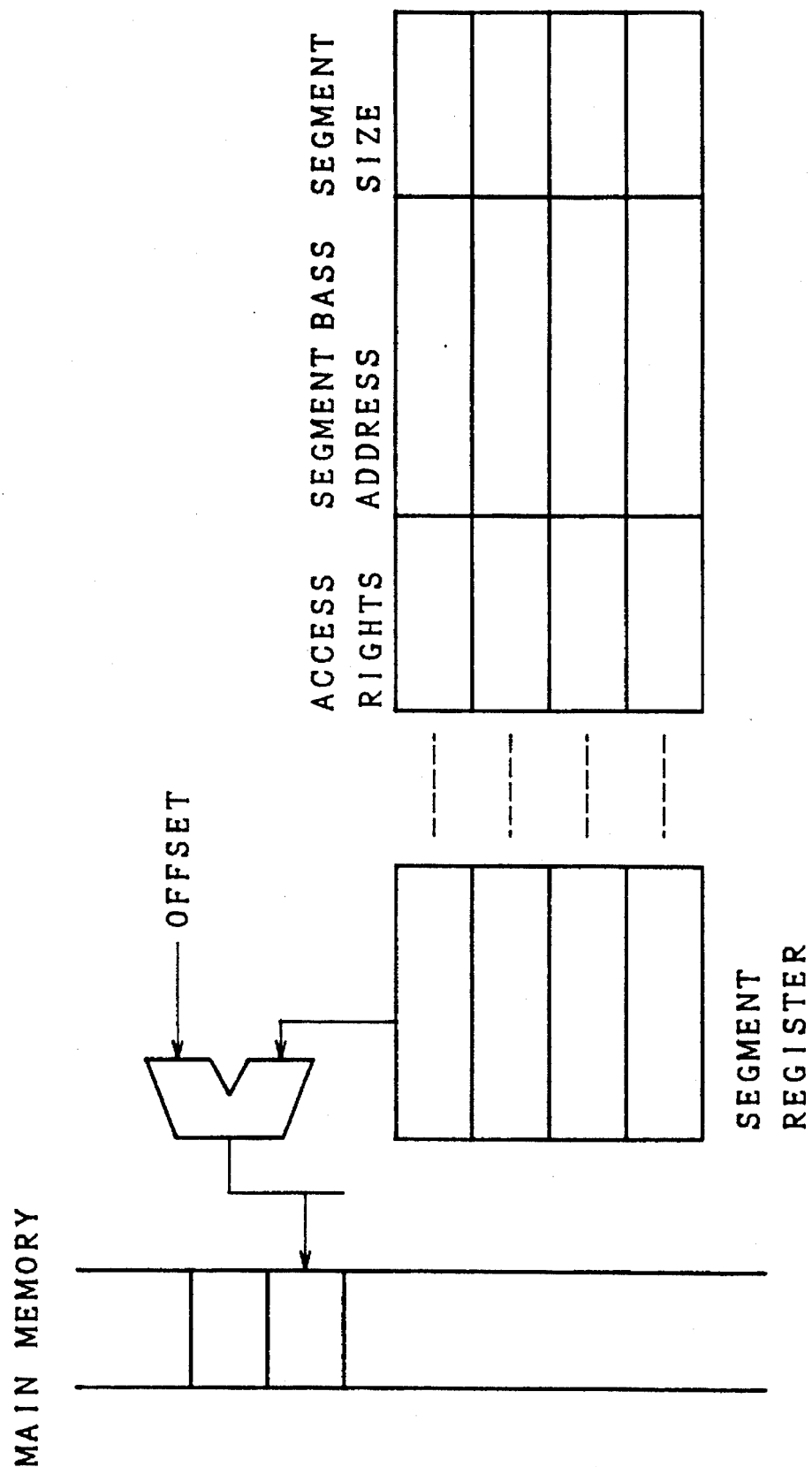
FIG. 3 is the schematic diagram denoting the constitution of the address translation system of the data processor related to the invention.

Alternatively, when using the address translation system shown in FIG. 3, if either the value of segment register or the access is changed by execution of instructions, the CPU 1 then executes PIB instruction to invalidate the data in the instruction pipeline or the access with respect to an instruction in order that the CPU 1 can fetch correct instruction or data from the main memory 3 after changing either the value of segment register or the address.

By providing the data processor with branch prediction system storing the branch records, all the data stored in memory means can be invalidated by allowing the CPU 1 to execute PIB instruction. Likewise, all the instructions stored in branch destination cache memory (branch target buffer) are also invalidated by allowing the CPU 1 to execute instruction, Consequently, after executing PIB instruction, those instructions or data stored in the main memory 3 can securely match the instructions or data actually being processed. Further details of the data processor incorporating PIB instruction featuring the present invention are disclosed in the preceding invention "DATA PROCESSOR", which was filed under Japanese Patent Application No. 62-247418 (1987) and applied for a patent by the same inventors as the present invention.

As is clear from the foregoing description, even if any conflict occur by rewriting of instructions, or by change of the content of the main memory, or by change of the content of the address translation system, the data processor related to the invention executed PIB instruction which features the invention, and as a result, functions of cache memory, instruction queue, instruction pipeline, and branch prediction system are invalidated, and simultaneously, instruction having propriety is newly fetched. This securely ensures coordination between the instruction string of the main memory and the instruction which is actually being processed.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A data processor which is provided with a main memory and a cache memory storing parts of the contents of said main memory, and which executes an operating system and user programs, and executes instructions divided into at least a low priority privilege level group and a higher priority privilege level group said data processor comprising:

means for preliminarily fetching instructions in a program from the main memory to the cache memory;

means for executing a predetermined instruction, included in a user program and being in the low priority privilege group, where the predetermined instruction always invalidates the contents of said cache memory whenever the predetermined instruction is executed so that instructions following said predetermined instruction must be fetched from said main memory when the data processor is executing said user program.

2. A data processor as set forth in claim 1, wherein only a specific logical space of said cache memory is invalidated by execution of said predetermined instruction.

3. A data processor which is provided with a main memory, a cache memory prefetch unit, and processor prefetch unit, and which executes an operating system and user programs and executes instructions divided into at least a low priority privilege level group and a higher priority privilege level group, said data processor comprising:

a cache memory prefetch mechanism for prefetching instructions in a program from the main memory and storing the prefetched instructions in the cache memory;

means for executing a predetermined instruction, included in a user program and said low priority privilege group, where the predetermined instruction always invalidates the instructions stored by said cache memory prefetch mechanism whenever the predetermined instruction is executed so that instructions following said predetermined instruction must be fetched from said main memory when the data processor is executing a user program.

4. A data processor as set forth in claim 3, wherein only a specific logical space of said cache memory prefetch mechanism is invalidated by execution of said predetermined instruction.

5. A data processor which is provided with a main memory and a cache memory and which executes an operating system and user programs, and executes instructions divided into at least a low priority privilege level group and a higher priority privilege level group, said data processor comprising:

a pipeline mechanism for sequentially executing a plurality of instructions in a program from the main memory to the instruction buffer;

means for executing a predetermined instruction, included in a user program and said low priority privilege group, to invalidate instructions not yet executed in said plurality of instructions being executed by said pipeline mechanism and to invalidate the cache memory whenever the predetermined instruction is executed so that instructions following said predetermined instruction must be fetched from said main memory when the data processor is executing a user program.

6. A data processor which is provided with a main memory which executes an operating system and user programs and executes instructions divided into at least a low priority privilege group and a higher priority privilege group, said data processor comprising:

a branch prediction mechanism for storing branch history information;

means for executing a predetermined instruction, included in a user program and said low priority privilege level group, to always invalidate, upon execution, the branch history information stored by said branch prediction mechanism so that instructions following said predetermined instruction are fetched from said main memory when the data processor is executing said user program.

7. A data processor as set forth in claim 6, wherein only a specific logical space of said branch prediction mechanism is invalidated by execution of said predetermined instruction.

* * * * *